United States Patent
Wu et al.

(10) Patent No.: US 9,391,382 B1
(45) Date of Patent: Jul. 12, 2016

(54) CARD CONNECTOR HAVING A HEAT ACTIVATED FILM WELDED BETWEEN A SHIELDING SHELL AND A HOUSING

(71) Applicant: Cheng Uei Precision Industry Co., Ltd., New Taipei (TW)

(72) Inventors: Yun Wu, Dong-Guan (CN); Chao Yong Ye, Dong-Guan (CN); Kai Hsiang Chang, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/814,507

(22) Filed: Jul. 30, 2015

(51) Int. Cl.
*H01R 13/52* (2006.01)
*H01R 12/70* (2011.01)
*H01R 13/633* (2006.01)
*H01R 13/6581* (2011.01)

(52) U.S. Cl.
CPC ........ *H01R 12/7076* (2013.01); *H01R 13/5202* (2013.01); *H01R 13/633* (2013.01); *H01R 13/6581* (2013.01)

(58) Field of Classification Search
CPC ........ H01R 13/52; H01R 13/40; H01R 24/00; H01R 13/5202; H01R 13/5205

USPC .......... 439/587, 271–276, 629–630, 159–160
See application file for complete search history.

(56) References Cited

U.S. PATENT DOCUMENTS

| | | | |
|---|---|---|---|
| 8,337,245 B1 * | 12/2012 | Wang .................. | H01R 12/724 439/271 |
| 2011/0230074 A1 * | 9/2011 | Schmidt .............. | H01R 13/405 439/271 |
| 2013/0005167 A1 * | 1/2013 | Matsumoto .......... | H01R 12/714 439/159 |
| 2016/0006173 A1 * | 1/2016 | Wang .................... | G06K 13/08 439/157 |

* cited by examiner

*Primary Examiner* — Chandrika Prasad
(74) *Attorney, Agent, or Firm* — Cheng-Ju Chiang

(57) ABSTRACT

A card connector for receiving an electrical card therein includes an insulating housing, a plurality of electrical contacts, a plastic sheet, a shielding shell and a heat activated film. The insulating housing has a bottom wall, a rear wall and two side walls which together form an inserting chamber. The electrical contacts are fixed in the bottom wall of the insulating housing. The plastic sheet is pasted on a bottom of the insulating housing. The shielding shell covers on the insulating housing. The heat activated film is welded between the shielding shell and the rear wall and the side walls of the insulating housing.

7 Claims, 5 Drawing Sheets

CARD CONNECTOR HAVING A HEAT ACTIVATED FILM WELDED BETWEEN A SHIELDING SHELL AND A HOUSING

BACKGROUND OF THE INVENTION

1. Field of the Invention

The present invention relates to a connector, and more particularly to a card connector.

2. The Related Art

Nowadays, card connectors are widely used in electronic products or electronic equipments. A traditional card connector for receiving an electrical card therein usually includes an insulating housing, a plurality of electrical contacts and a shielding shell. The electrical contacts are molded in the insulating housing and the shielding shell covers on the insulating housing. The shielding shell and the insulating housing together form an inserting chamber for receiving the electrical card therein.

However, when the electronic products or the electronic equipments used in outdoor sites of rainy day or humid environment. The water vapour or the liquid easily seeps in the interior of the card connector to affect the electrical properties and life time.

SUMMARY OF THE INVENTION

Accordingly, an object of the present invention is to provide a card connector for receiving the electrical card therein. The card connector includes an insulating housing, a plurality of electrical contacts, a plastic sheet, a shielding shell and a heat activated film. The insulating housing has a bottom wall, a rear wall and two side walls which together form an inserting chamber. The electrical contacts are fixed in the bottom wall of the insulating housing. The plastic sheet is pasted on a bottom of the insulating housing. The shielding shell covers on the insulating housing. The heat activated film is welded between the shielding shell and the rear wall and the side walls of the insulating housing.

As described above, the heat activated film is welded between the shielding shell and the insulating housing, the plastic sheet is pasted on the bottom of the insulating housing, therefore, the card connector is sealed better and further achieves the effect of waterproof.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
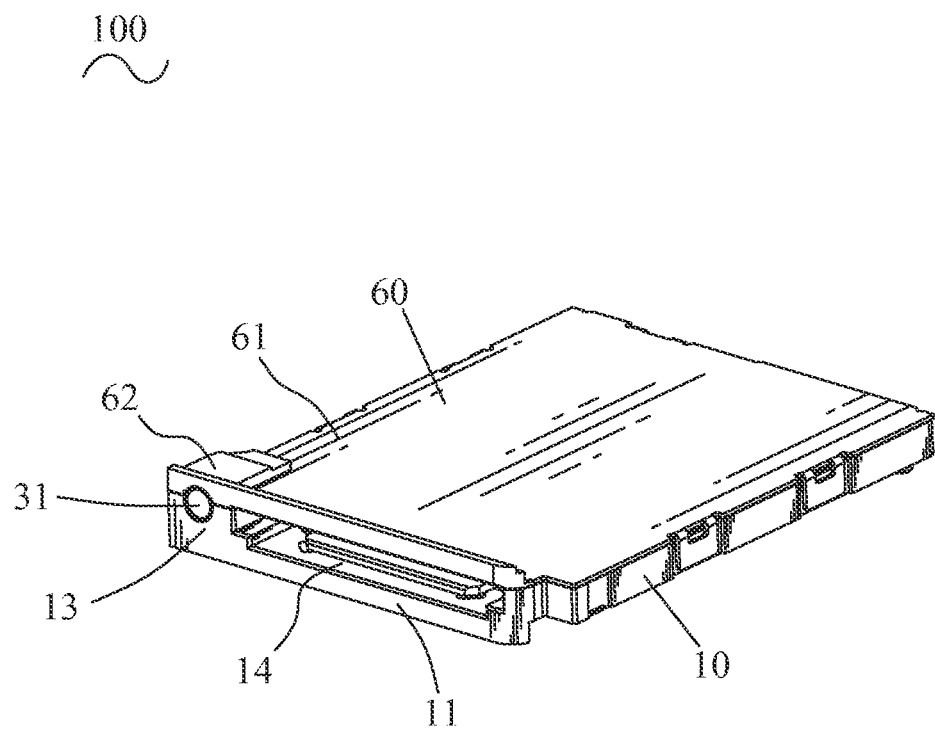
FIG. 1 is an assembled, perspective view of a card connector in accordance with an embodiment of the present invention.
Figure 2:
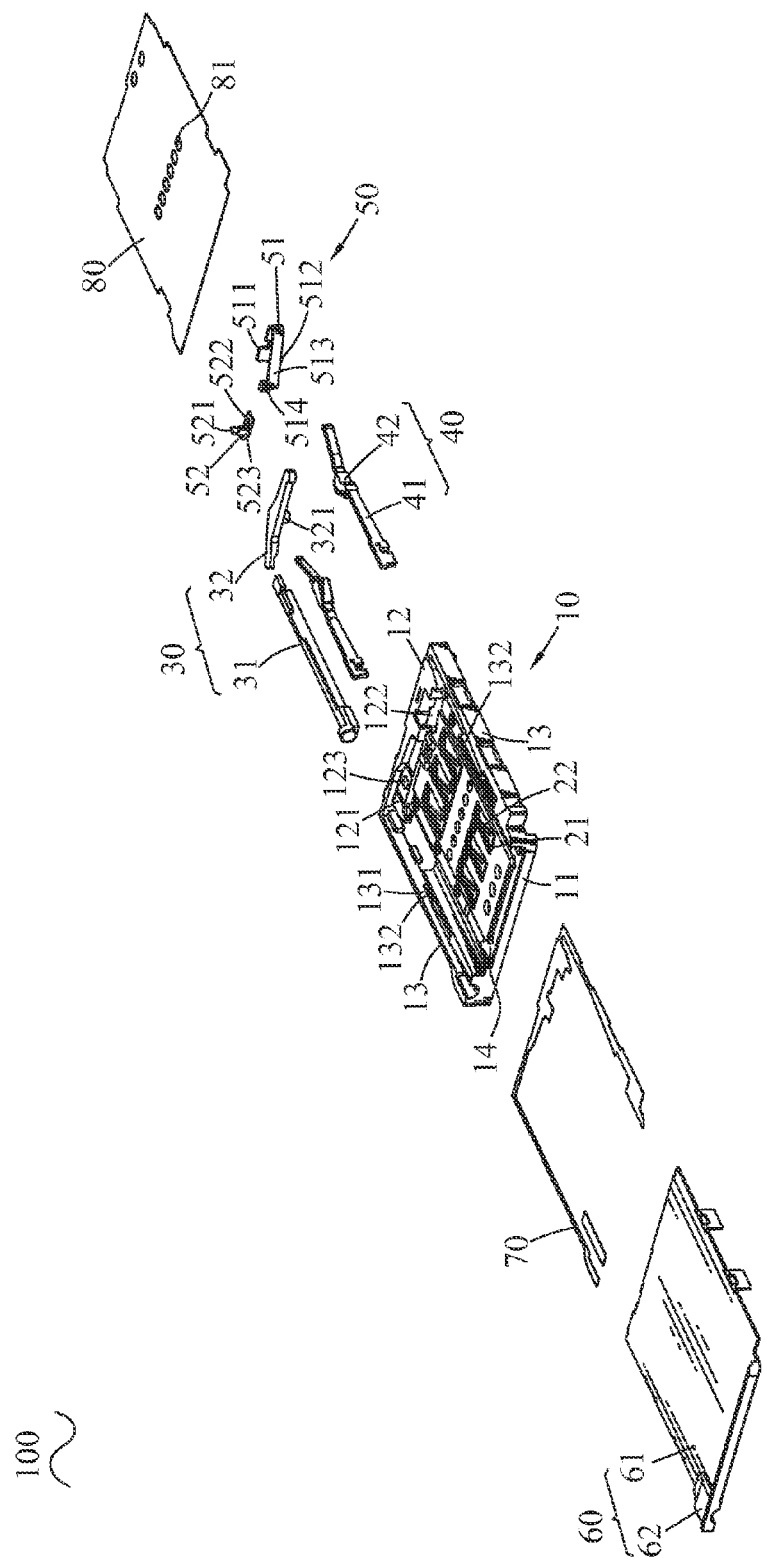
FIG. 2 is an exploded, perspective view of the card connector shown in FIG. 1.
Figure 3:
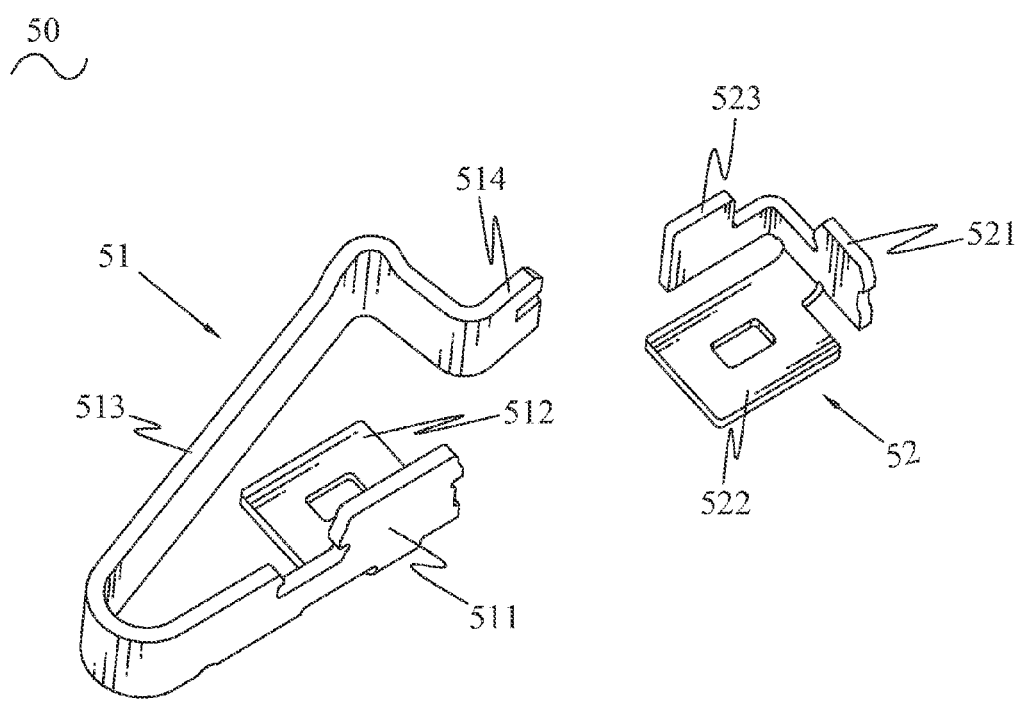
FIG. 3 is perspective view of a detecting mechanism of the card connector shown in FIG. 1.
Figure 4:
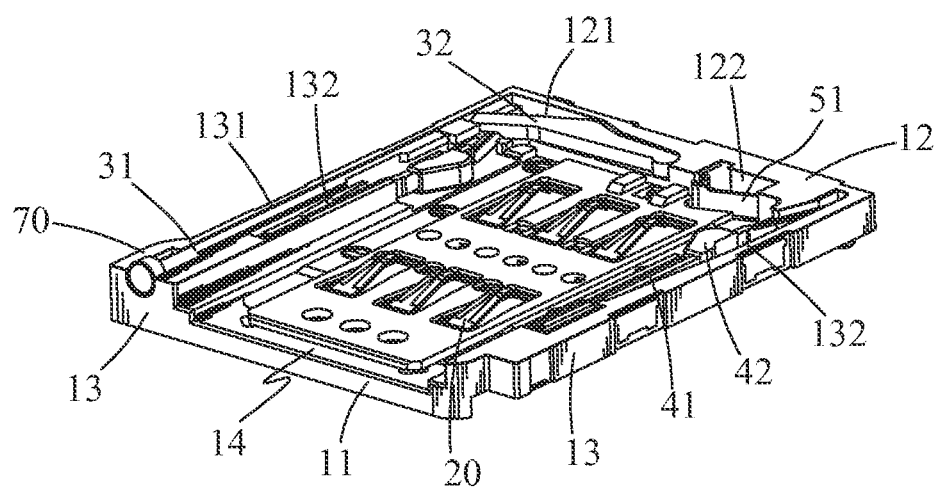
FIG. 4 is an assembled, perspective view of the card connector without the shielding shell of FIG. 1.
Figure 5:
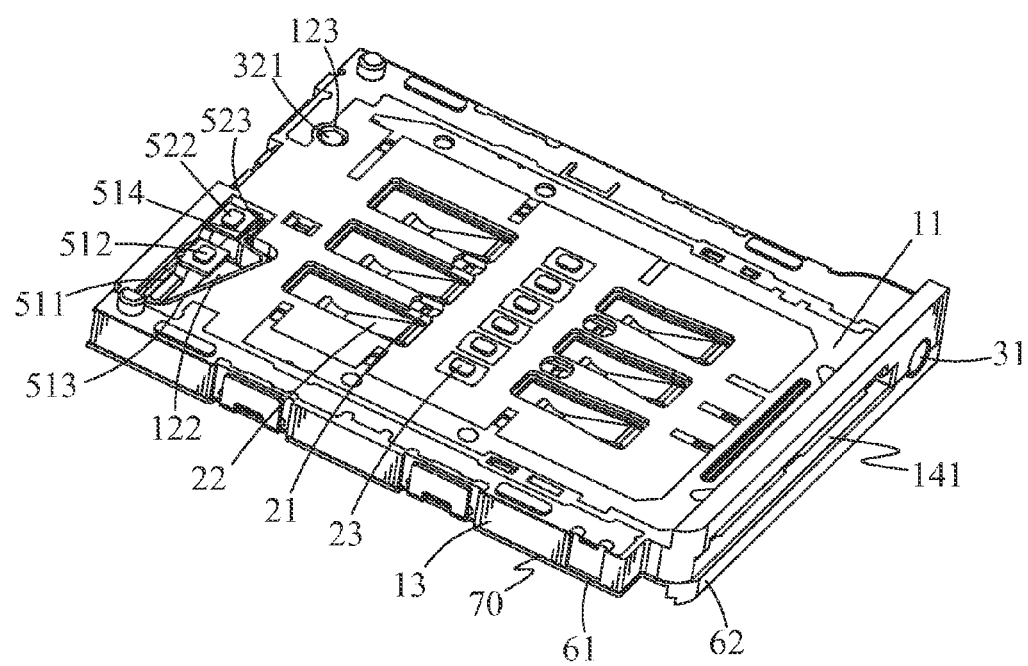
FIG. 5 is a bottom plan view of the card connector without the plastic sheet of FIG. 1.

Referring to the drawings in greater detail, and first to FIG. 1 to FIG. 5, an embodiment of the present invention is embodied in a card connector 100 for receiving an electrical card (not shown) therein. The card connector 100 includes an insulating housing 10, a plurality of electrical contacts 20, an ejector mechanism 30, a pair of clamping contacts 40, a detecting mechanism 50, a shielding shell 60, a heat activated film 70 and a plastic sheet 80.

The insulating housing 10 has a bottom wall 11, a rear wall 12 and two side walls 13 which together form an inserting chamber 14. A sliding slot 131 is opened in one side wall 13 of the insulating housing 10. A rear wall 12 of the insulating housing 10 opens an active slot 121 connecting to the sliding slot 131. Portions of the two side walls 13 adjacent to the inserting chamber 14 open a pair of clamping slots 132 connecting to the inserting chamber 14. A side of the rear wall 12 adjacent to the active slot 121 and far away from the sliding slot 131 opens a detecting slot 122. The detecting mechanism 50 is received in the detecting slot 122.

Each of the electrical contacts 20 has a fixed portion 21. One side of the fixed portion 21 protrudes upward to form an elastic portion 22. The other side of the fixed portion 21 protrudes downward to form a soldering portion 23. The electrical contacts 20 are molded in the bottom wall 11 of the insulating housing 10. The elastic portion 22 projects upward into the inserting chamber 14 and the soldering portion projects downward beyond a bottom face of the bottom wall 11 of the insulating housing 10.

The ejector mechanism 30 includes an ejector rod 31 and a pivot arm 32. The pivot arm 32 protrudes downward to form a column 321. A bottom of the active slot 121 of the insulating housing 10 is opened a round hole 123 corresponding to the column 321 of the pivot arm 32. The ejector rod 31 is slidable in a longitudinal direction in the sliding slot 131. The column 321 of the pivot arm 32 is located in the round hole 123. The pivot arm 32 is fixed in the active slot 121 of the insulating housing 10 and rotatable in clockwise direction or in anti-clockwise direction.

In the embodiment of the present of the card connector 100, when need to eject the electrical card, push the ejector rod 31 rearward and a rear end of the ejector rod 31 pushes one side of the pivot arm 32 rearward, at the same time, the pivot arm 32 rotates in clockwise direction around the column 321, and the other side of the pivot arm 32 pushes the electrical card frontward to make sure a part of the electrical card expose out of the inserting chamber 14 of the insulating housing 10, so users can take out the electrical card conveniently.

Each of the clamping contacts 40 has a clamping arm 41 and a clamping lump 42 integratedly formed inside the clamping arm 41 and in an approximately middle part of the clamping arm 41. The clamping arm 41 of the clamping contact 40 is located in the clamping slot 132 of the side wall 13 of the insulating housing 10 and the clamping lump 42 projects into the inserting chamber 14 of the insulating housing 10. In the embodiment of the card connector 100, when the electrical card is inserted in the inserting chamber 14 completely, the clamping lumps 42 of the clamping contacts 40 are clamped on two sides of the electrical card to prevent the electrical card away from the inserting chamber 14 of the insulating housing 10.

The detecting mechanism 50 includes a detecting contact 51 and a ground contact 52. The detecting contact 51 and the ground contact 52 are arranged in a transverse direction. The detecting contact 51 has a first fixed strip 511 placed vertically and extended in the transverse direction. A bottom end of the first fixed strip 511 is bent frontward and further extended to form a first soldering foot 512. An end of the first fixed strip 511 far from the ground contact 52 is arc-shaped bent frontward and extended to form a first elastic portion 513. An end of the first elastic portion 513 is bent rearward and extended towards the ground contact 52 to form a first overlap portion 514. The ground contact 52 has a second fixed strip 521 placed vertically and extended in the longitudinal direction. A bottom end of the second fixed strip 521 is bent towards the detecting contact 51 to form a second soldering foot 522. A front end of the second fixed strip 521 is bent towards the detecting contact 51 to form a second overlap portion 523. The first fixed strip 511, the first elastic portion 513 and the first overlap portion 514 of the detecting contact 51 and the second fixed strip 521 and the second overlap portion 523 of the ground contact 52 are located in the detecting slot 122 of the rear wall 12 of the insulating housing 10. The first soldering foot 512 of the detecting contact 51 and the second soldering foot 522 of the ground contact 52 project downward beyond a bottom of the insulating housing 10. The first overlap portion 514 of the detecting contact 51 is overlapped on the second overlap portion 523 of the ground contact 52.

In the embodiment of the card connector 100, in initial status, the first overlap portion 514 of the detecting contact 51 is overlapped on the second overlap portion 523 of the ground contact 52. When the electrical card is inserted rearward into the inserting chamber 14 of the insulating housing 10, a rear end of the electrical card resists against the first elastic portion 513 of the detecting contact 51 and drives the first overlap portion 514 away from the second overlap portion 523 of the ground contact 52.

The shielding shell 60 has a shielding plate 61 and a shielding housing 62. The shielding housing 62 is molded outside a front of the shielding plate 61. The shielding shell 60 covers on the insulating housing 10. In detail, the shielding plate 61 of the shielding shell 60 covers on the insulating housing 10 to cooperate with the inserting chamber 14 of the insulating housing 10 to cover the electrical card.

The heat activated film 70 is welded between the shielding shell 60 and the rear wall 12 and the side walls 13 of the insulating housing 10.

The plastic sheet 80 is pasted on the bottom of the insulating housing 10. The plastic sheet 80 is opened a plurality of holes 81 corresponding to the solder portions 23 of the electrical contacts 20, the first soldering foot 512 of the detecting contact 51 and the second soldering foot 522 of the ground contact 52. The solder portions 23 of the electrical contacts 20, the first soldering foot 512 of the detecting contact 51 and the second soldering foot 522 of the ground contact 52 further project downward beyond the plastic sheet 80 to electrically connect to the external equipment.

As described above, the heat activated film 70 is welded between the shielding shell 60 and the insulating housing 10, the plastic sheet 80 is pasted on the bottom of the insulating housing 10, therefore, the card connector 100 is sealed better and further achieves the effect of waterproof.

What is claimed is:

1. A card connector for receiving an electrical card therein, comprising:
    an insulating housing having a bottom wall, a rear wall and two side walls which together form an inserting chamber;
    a plurality of electrical contacts fixed in the bottom wall of the insulating housing;
    a plastic sheet pasted on a bottom of the insulating housing;
    a shielding shell covering on the insulating housing; and
    a heat activated film welded between the shielding shell and the rear wall and the side walls of the insulating housing.

2. The card connector as claimed in claim 1, wherein each of the electrical contacts has a fixed portion, one side of the fixed portion protrudes upward to form an elastic portion, the other side of the fixed portion protrudes downward to form a soldering portion, the elastic portion projects upward into the inserting chamber and the soldering portion projects downward beyond a bottom face of the bottom wall of the insulating housing.

3. The card connector as claimed in claim 2, wherein the plastic sheet includes a plurality of holes corresponding to the solder portions of the electrical contacts, the solder portions of the electrical contacts further project downward beyond the plastic sheet.

4. The card connector as claimed in claim 1, wherein one of the side walls of the insulating housing opens a sliding slot, the rear wall of the insulating housing opens an active slot connecting to the sliding slot, the card connector further includes an ejector mechanism including an ejector rod and a pivot arm, the pivot arm protrudes downward to from a column, the active slot of the insulating housing opens a round hole corresponding to the column of the pivot arm, the ejector rod is slidable in a longitudinal direction in the sliding slot, the column of the pivot arm is fixed in the round hole, the pivot arm is fixed in the active slot of the insulating housing and rotatable in clockwise direction or in anticlockwise direction.

5. The card connector as claimed in claim 1, wherein the two side walls of the insulating housing open a pair of clamping slots connecting to the inserting chamber, the card connector further includes a pair of clamping contacts each having a clamping arm and a clamping lump integratedly formed inside the clamping arm and in an approximately middle part of the clamping arm, the clamping arm of the clamping contact is located in the clamping slot of the side wall of the insulating housing and the clamping lump projects into the inserting chamber of the insulating housing.

6. The card connector as claimed in claim 1, wherein a side of the rear wall adjacent to the active slot and far away from the sliding slot opens a detecting slot, the card connector further including a detecting mechanism received in the detecting slot, the detecting mechanism includes a detecting contact and a ground contact, the detecting contact has a first fixed strip placed vertically and extended in a transverse direction, a bottom end of the first fixed strip is bent frontward and further extended to form a first soldering foot, an end of the first fixed strip far from the ground contact is arc-shaped bent frontward and extended to form a first elastic portion, an end of the first elastic portion is bent rearward and extended towards the ground contact to form a first overlap portion, the ground contact has a second fixed strip placed vertically and extended in a longitudinal direction, a bottom end of the second fixed strip is bent towards the detecting contact to form a second soldering foot, a front end of the second fixed strip is bent towards the detecting contact to from a second overlap portion, the first fixed strip, the first elastic portion and the first overlap portion of the detecting contact and the second fixed strip and the second overlap portion of the ground contact are located in the detecting slot of the rear wall of the insulating housing, the first soldering foot of the detecting contact and the second soldering foot of the ground contact project downward beyond a bottom of the insulating housing, the first overlap portion of the detecting contact is overlapped on the second overlap portion of the ground contact.

7. The card connector as claimed in claim 1, wherein the shielding shell has a shielding plate and a shielding housing, the shielding housing is molded outside of a front of the shielding plate.

* * * * *